Aug. 20, 1940.
F. S. REED
2,212,455
ADJUSTABLE PIPE RAILING FITTING
Filed Oct. 18, 1938
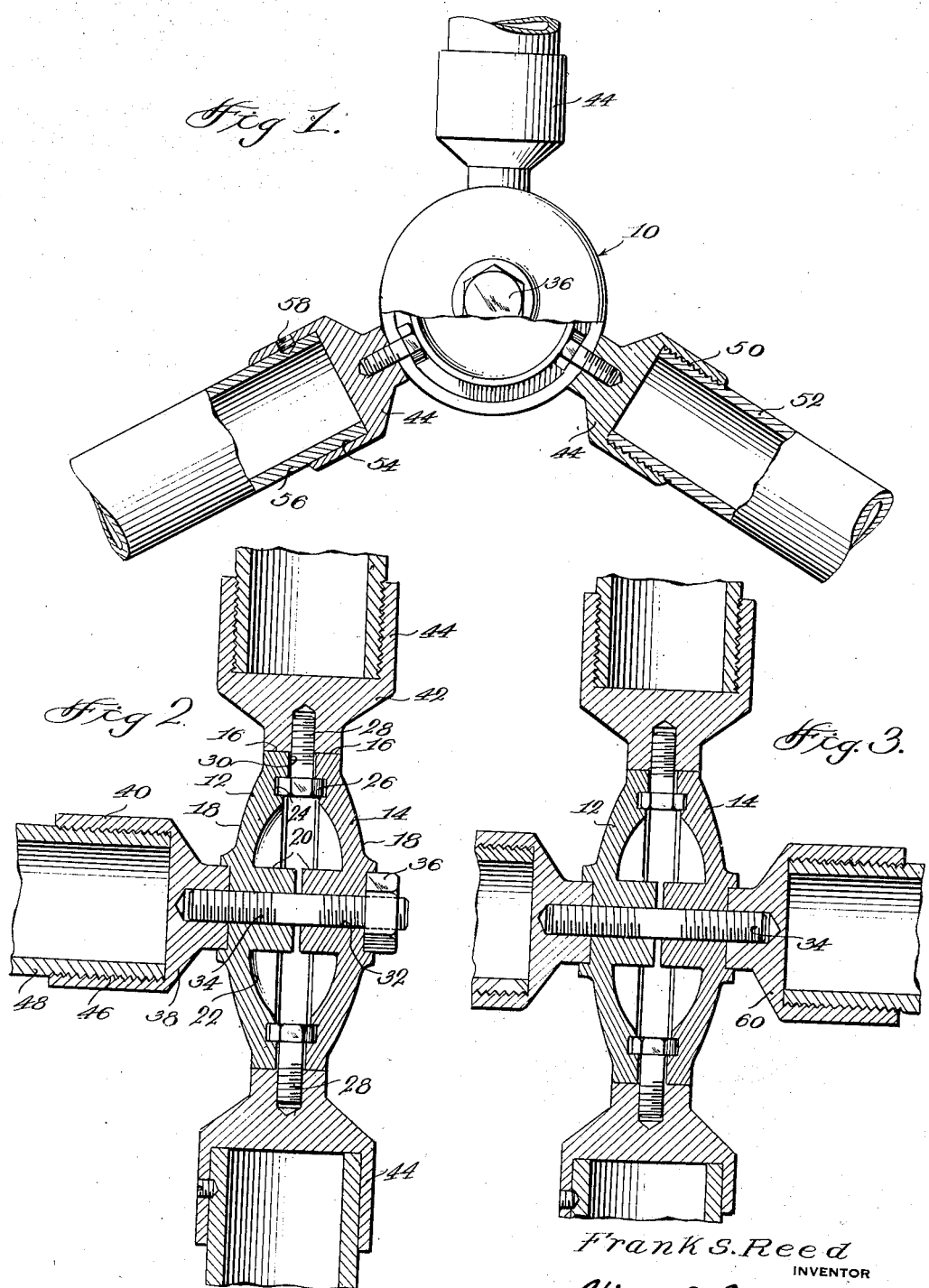
Frank S. Reed
INVENTOR
BY Victor J. Evans & Co.
ATTORNEYS Patented Aug. 20, 1940

2,212,455

UNITED STATES PATENT OFFICE 2,212,455

ADJUSTABLE PIPE RAILING FITTING

Frank S. Reed, Cincinnati, Ohio

Application October 18, 1938, Serial No. 235,690

3 Claims. (Cl. 287—14)

My invention relates to connecting facilities, and has among its objects and advantages the provision of an improved adjustable pipe railing fitting.

An object of my invention is to provide a fitting designed for interconnecting a plurality of pipes arranged in various angular relation.

More specifically, I employ a two-piece body with which I associate a plurality of sockets for connection with pipe ends with the sockets adjustable to various positions for securing the desired angularity between the pipes and the like.

In the accompanying drawing:

Figure 1 is an elevational view of my invention with certain parts broken away for the sake of clearness;

Figure 2 is a sectional view illustrating the manner in which a laterally extending pipe may be associated with the earth; and Figure 3 is a view similar to Figure 2 illustrating the manner in which two laterally extending pipes may be incorporated with the radially extending pipe assembly.

In the embodiment selected to illustrate my invention, I make use of a coupling unit 10 comprising sections 12 and 14. These sections are identical in construction with each having a peripheral wall 16 of the same diameter. The sections 12 and 14 include convex walls 18 having axially aligned bosses 20 extending upwardly from the concaved faces 22. Each section includes a groove 24 aligned with a groove in the other section for the reception of heads 26 of bolts 28 extending through the spaces 30 between the sections and radially arranged with respect to the axes of the sections.

Bosses 20 are provided with openings 32 for the reception of a stud bolt 34 which may be provided with a nut 36 on one end and the threaded base 38 of a socket 40 on the other end. Tightening of the socket 40 will draw the sections 12 and 14 into clamping relation upon the bolt heads 26 for securing the same in preselected positions, for example, as illustrated in Figure 1. The space 30 extends completely upon the unit 10 so that the bolts 28 may be adjusted to any position as desired. The bolts 28 have threaded connection with the bases 42 of sockets 44. The socket 40 may be threaded at 46 for threaded connection with a pipe 48. One of the sockets 44 is illustrated as being threaded at 50 for threaded connection with a pipe 52. The other sockets are illustrated as being reamed at 54 for the reception of pipes 56 which are made secure by set screws 58. All of the sockets may be threaded or reamed.

Figure 3 illustrates a construction such as that illustrated in Figures 1 and 2, but with an additional socket 60 threaded to the stud bolt 34. In this view, the nut 36 is removed to provide accommodation for the socket 60.

It will thus be seen that I have provided a fitting through the medium of which pipes in interconnected railings, fences and the like may be interconnected in any desired angular relation through the medium of a simple fitting constituting two principal parts. In addition, the fitting is so designed as to accommodate sockets for connection with laterally extending pipes.

Without further elaboration, the foregoing will so fully illustrate my invention that others may, by applying current knowledge, readily adapt the same for use under various conditions of service.

I claim:

1. An adjustable pipe railing fitting comprising circular sections of the same diameters and having peripheral faces, said sections being arranged side by side and spaced throughout their entire circumference, bolts extending through the space between the sections, said bolts being provided with heads and said sections having head clamping formations restraining the bolts from relative axial movement, pipe mounts threadedly connected with said bolts and threaded against said peripheral faces, bolt means extending transversely through said sections, and a pipe mount threadedly connected with said bolt means and cooperating with at least one of said sections for clamping the two sections upon said bolt heads for fixedly securing the bolts.

2. An adjustable pipe railing fitting comprising circular sections of the same diameters and having peripheral faces, said sections being arranged side by side and spaced, bolts extending through the space between the sections, said bolts being provided with heads and said sections having formations for receiving the heads of said bolts and to restrain the bolts from relative axial movement, pipe mounts threadedly connected with said bolts and threaded against said peripheral faces, a bolt extending through both sections, and pipe mounts threadedly connected with said last bolt and cooperating with the latter and said sections for clamping the latter upon said bolt heads to fixedly unite the sections and to fixedly secure said first bolts.

3. An adjustable pipe railing fitting comprising two spaced and circular sections of equal diameters having opposed faces, said sections being coaxially positioned and said opposed faces each having a circular groove, said circular grooves being of equal diameters and facing each other, bolts having heads located in said grooves and extending radially of said sections between said opposed faces for connection with pipe mounts adapted to be threadedly connected with the bolts and brought into frictional engagement with both sections, and bolt means extending transversely through said sections at the axes thereof, said bolt means having at least one end extending laterally of one section for threaded connection with a pipe mount adapted to be brought into frictional engagement with said one section for clamping the two sections upon said bolts for fixedly securing the latter.

FRANK S. REED.